Patented Dec. 8, 1931                                               1,835,965

UNITED STATES PATENT OFFICE

JOHN J. PHELAN, OF TROY, NEW YORK, ASSIGNOR TO GENERAL ELECTRIC COMPANY, A CORPORATION OF NEW YORK

BRAZING FLUX

No Drawing.    Application filed January 25, 1930. Serial No. 423,545.

The present invention relates to a brazing flux and more particularly to a flux adapted to be employed in brazing, welding or soldering readily oxidizable metals such as iron-chromium, iron-nickel-chromium and the like.

In my United States Patent No. 1,717,250, June 11, 1929, I have disclosed a brazing flux consisting of potassium acid fluoride and potassium tetra-borate. However, the flux disclosed in the above patent possesses certain disadvantages, for example the commercial tetra-borate varies in composition, is somewhat difficult to obtain and usually contains a considerable amount of water of crystallization which sometimes causes the brazed joint to be defective due to the presence of pin holes therein.

It is one of the objects of the present invention to provide a dry brazing flux which is of general utility but is particularly suitable for use in brazing, soldering or welding readily oxidizable metals.

In carrying out my invention I mix together potassium carbonate ($K_2CO_3$), boric acid ($H_3BO_3$) and potassium acid fluoride ($KHF_2$). The proportions of material employed may vary considerably depending on the work to be performed. A flux consisting of about 20% potassium carbonate, 20% boric acid and 60% potassium acid fluoride gives uniformly satisfactory results in soldering, brazing or welding joints which are readily accessible. In brazing parts in which the joint is not readily accessible such as a flat surface and a perpendicular rod, a flux consisting of about 17% potassium carbonate, 33% boric acid and 50% potassium acid fluoride may be employed to advantage. While these examples illustrate the preferred composition of the flux, the invention is not limited to the specific proportions recited, since the amount of each ingredient in the flux may be varied through a considerable range and still produce a satisfactory flux. For example, each of the ingredients may vary from about 13% to about 75%. The best results however will be obtained by the use of the preferred compositions.

In preparing the flux, it is desirable to employ dry materials. The boric acid and the acid fluoride are naturally in a dry condition. The carbonate may be dried at a temperature of about 110° C. in a suitable oven. Although none of the ingredients of the flux is very hygroscopic the resultant product is quite hygroscopic. The mixing should therefore be carried out under dry atmospheric conditions and the product preserved free from moisture.

The potassium acid fluoride is generally supplied in crystalline form and is preferably ground to a degree fine enough to pass through a 25 to 60 mesh sieve. The carbonate and borate should be in powdered form at least as fine as the powdered fluoride. When the materials have this degree of fineness it will be found that pin holes in the brazed joints are practically eliminated.

Ordinarily, in brazing or soldering operations difficulty is encountered by removing the excess flux from the joint. However, when the present flux is employed this difficulty does not exist since the excess material may be easily wiped off or washed away with water.

Although I prefer to employ potassium carbonate and potassium acid fluoride, other alkali carbonates and alkali fluorides may be employed if desired. The best results however are obtained by using potassium carbonate and potassium acid fluoride.

What I claim as new and desire to secure by Letters Patent of the United States, is:

1. A flux consisting mainly of an alkali acid fluoride but containing appreciable quantities of boric acid and an alkali carbonate, the quantity of boric acid present in the flux being at least equal to the quantity of alkali carbonate.

2. A flux consisting mainly of potassium acid fluoride but containing appreciable quantities of boric acid and potassium carbonate, the quantity of boric acid present in the flux being at least equal to the quantity of potassium carbonate.

3. A flux containing at least 50% of potassium acid fluoride and about 20% potassium carbonate, the remainder of the flux consisting substantially of boric acid.

In witness whereof, I have hereunto set my hand this 24th day of January, 1930.

JOHN J. PHELAN.